United States Patent [19]
Neal

[11] Patent Number: 5,969,506
[45] Date of Patent: Oct. 19, 1999

[54] APPARATUS AND METHOD FOR RAPID BULK CHARGING OF A LEAD ACID BATTERY

[75] Inventor: Martin Neal, Redditch, United Kingdom

[73] Assignee: C & K Systems, Inc., Folsom, Calif.

[21] Appl. No.: 09/021,918

[22] Filed: Feb. 11, 1998

Related U.S. Application Data

[60] Provisional application No. 60/055,460, Aug. 11, 1997.

[51] Int. Cl.⁶ .......................................................... H02J 7/00
[52] U.S. Cl. ............................. 320/125; 320/160; 307/66
[58] Field of Search ............................ 320/160, 162–164, 320/146, 125; 307/64, 66, 48

[56] References Cited

U.S. PATENT DOCUMENTS

| | | |
|---|---|---|
| 3,735,233 | 5/1973 | Ringle . |
| 4,233,553 | 11/1980 | Prince, Jr. et al. . |
| 4,392,101 | 7/1983 | Saar et al. . |
| 4,460,863 | 7/1984 | Conforti . |
| 4,609,861 | 9/1986 | Inaniwa et al. . |
| 4,667,143 | 5/1987 | Cooper et al. . |
| 4,670,703 | 6/1987 | Williams . |
| 4,686,443 | 8/1987 | Steblay . |
| 4,952,861 | 8/1990 | Horn . |
| 5,204,611 | 4/1993 | Nor et al. . |
| 5,233,284 | 8/1993 | Mattson . |
| 5,304,916 | 4/1994 | Le et al. . |
| 5,329,219 | 7/1994 | Garrett . |
| 5,331,268 | 7/1994 | Patino et al. . |
| 5,500,584 | 3/1996 | Shimomoto . |
| 5,550,453 | 8/1996 | Bohne et al. . |
| 5,623,197 | 4/1997 | Roseman et al. . |
| 5,710,506 | 1/1998 | Broell et al. . |
| 5,869,949 | 2/1999 | Nishikawa et al. . |

Primary Examiner—Peter S. Wong
Assistant Examiner—K. Shin
Attorney, Agent, or Firm—John P. O'Banion

[57] ABSTRACT

Apparatus to rapidly bulk charge a lead acid battery used in a "standby" power supply unit (PSU), or similar equipment containing said function, such as in an alarm panel system, fire panel (system) etc., without increasing the output capacity of the regulated PSU, significantly increasing its dissipation, size or cost, or causing an unacceptable recharge time of (often) several days. The apparatus comprises minimal additional components to provide a bulk charge of approximately 70% capacity to a 65 Ahr battery within 14 hours, while only drawing an average current of approximately 0.4 amp from the regulated PSU.

20 Claims, 4 Drawing Sheets

APPARATUS AND METHOD FOR RAPID BULK CHARGING OF A LEAD ACID BATTERY

This application claims benefit of Provisional application Ser. No. 60/055460 filed Aug. 11, 1997.

BACKGROUND OF THE INVENTION

1. Field of the Invention

The present invention relates generally to charging circuits used for charging lead-acid batteries and more particularly to a circuit arrangement for bulk charging a lead acid battery in a short time period.

2. Description of Related Art

Rechargeable batteries used in "standby" applications are typically "float charged" from a fixed voltage, regulated, power supply unit (PSU). A 12 volt, regulated, lead acid battery is typically "floated" at 13.65±0.25 volts at 20° C., and when fully charged will draw a few tens of milliamps depending upon capacity, age, etc. While this approach maintains the battery at near 100% capacity, two problems arise when a discharged battery is connected to the PSU, such as when the main AC supply is restored after a prolonged power interruption or when a discharged battery is connected to the PSU.

The first problem is that the PSU has to be designed to provide a significantly higher current than normal to recharge a discharged battery. This requirement increases the size, complexity, cost and dissipation of the PSU just for the infrequent occasions when battery recharge is required. The second problem is that the PSU must be equipped with some means of limiting the battery recharge current to prevent PSU overload, because the lead acid battery has a very low impedance.

One approach to rapidly charging a lead acid battery is described in U.S. Pat. No. 4,609,861 issued Sep. 2, 1986 to Masahira Inaniwa et al wherein a circuit for rapidly charging a lead-acid battery of the sealed type comprises detecting the voltage of the battery, a constant-current charging circuit, a constant-voltage charging circuit, and a timer circuit responsive to the voltage detecting circuit. At the beginning of the charging operation, the battery is charged at a constant current, and when the voltage of the battery exceeds a predetermined value, charging mode is changed to constant-voltage charging which lasts for a predetermined period of time determined by the timer circuit. The charger may also comprise a trickle charge circuit so that trickle charge takes place after the constant-voltage charge. One or more heat-sensitive elements may be used for providing temperature compensation or fail-safe in response to the heat from the battery and heat from parts of the battery charger. A capacitor 50 may be used as a timer which is forcibly charged to insure a given period of time of the constant-voltage charging. A differential amplifier is used for detecting the voltage of the battery so that a power transistor, used as an element of the constant-current charging circuit, is controlled in response to an output signal from the differential amplifier to perform constant-voltage charging. However, this design requires an increased amount of circuitry for accomplishing its objective.

Another U.S. Pat. No. 4,952,861, issued Aug. 28, 1990 to Karl G. Horn describes a three-stage rapid charging process for charging maintenance-free lead batteries with a fixed electrolyte. The process comprises a first charging stage which proceeds at a constant current of the magnitude of a four-hour to eight-hour current until a temperature-dependent charging voltage is reached, a second charging stage which then continues at this temperature-dependent charging voltage for a limited time, and which is continuously adjusted to the battery's temperature, and a third charging stage which is again time-limited and which constitutes a secondary charging which proceeds according to an I/V characteristic curve with an initial charging current limited to between 0.05 and 0.5 times a ten-hour current and a battery voltage which is limited to between 2% and 8% above the temperature-dependent charging voltage. However, this design requires the measurement of temperatures either inside a representative battery cell, between two cells of the battery, or at the terminal connector between two cells.

Another U.S. Pat. No. 5,500,584 issued Mar. 19, 1996 to Kenkuhi Shimomoto describes a battery charging method for charging a lead acid storage battery quickly and a battery charging apparatus. The method includes an initial charging process between times 0 to $t_1$, where a charging current is increased gradually, a quick charging process between $t_1$ and $t_2$ where a charging current is larger than initially, and a final charging process between times $t_2$ to $t_3$ where charging current is reduced, carried out step wise and continuous. The battery charging apparatus comprises a primary circuit and a secondary circuit connected by the transformer. Single phase AC is applied to the primary circuit and the secondary circuit outputs connect to the battery. A control switch is turned on and off by a control signal from a control unit. A rectifier performs all wave rectification of the secondary transformer output. A charging current detector detects the terminal voltage of battery. Values from the charging current detector and the terminal voltage detector are fed to the control unit which controls the current supply to the charging circuit controlled by a semiconductor switch. However, this approach requires considerable control electronics.

SUMMARY OF THE INVENTION

Accordingly, it is therefore an object of this invention to provide a power supply unit capable of float charging or rapid bulk charging a lead acid battery in accordance with a monitored state of the battery.

It is another object of this invention to provide a power supply unit having a standby mode and a rapid charge mode with very little increase in power supply cost, number of components and power dissipation.

It is another object of this invention to increase bulk charge capacity beyond a nominal 70% to 80% or 90% by the addition of a Schottky diode to the circuit arrangement.

The objects are further accomplished by a circuit arrangement for rapidly charging a battery comprising means for charging a battery, the charging means having a standby mode and a rapid bulk charge mode, means coupled between the battery output and an output of the charging means for monitoring the battery voltage output and providing a float charge to the battery when the charging means is in the standby mode, and means, coupled to the battery output and having a control input coupled to the monitoring means, for providing a rapid bulk charge to the battery when the monitoring means senses a predetermined battery voltage output. The battery charging means provides a regulated voltage and an unregulated voltage. The monitoring means comprises a resistor, coupled between the regulated voltage and the battery voltage output, the resistor providing current limiting when the float charge is provided to the battery. In an alternate embodiment the monitoring means comprises a Schottky diode in series with the resistor which increases the bulk charge capacity beyond 70% to 80% after 16 hours and 90% after 16 hours. The means for providing the bulk charge comprises a control rectifier for providing a charge current to rapidly charge the battery. The means for providing the bulk charge further comprises a resistor having a first terminal in series with the control rectifier means for limiting the charge current, and a second terminal connected to an unregulated voltage of the circuit arrangement. The battery charging means comprises a diode, coupled between the unregulated voltage and an input of a voltage regulator of the circuit, for preventing current flow through the regulator when the circuit arrangement is operating in the rapid bulk charge mode. The circuit arrangement comprises a feedback, current limited, regulated power supply.

The objects are further accomplished by a circuit arrangement for rapidly charging a battery comprising power supply means for providing a regulated voltage and an unregulated voltage, resistor means coupled between the regulated voltage and a positive terminal of the battery for providing a current path to float charge the battery, switching means coupled between the positive terminal of the battery and the unregulated voltage via a series resistor, for providing a current path to rapid bulk charge the battery, the switching means having a control input coupled to the regulated voltage via a current limiting resistor, and diode means coupled between the unregulated voltage and a series regulator of the circuit arrangement for enabling the power supply means to operate in a float charge mode and in a rapid bulk charge mode.

The objects are further accomplished by a method for rapidly charging a battery comprising the steps of charging a battery with means having a standby mode and a rapid bulk charge mode, monitoring the battery voltage output and providing a float charge to the battery when the charging means is in the standby mode with means coupled between the battery output and an output of the charging means, and providing a rapid bulk charge to the battery when the monitoring means senses a predetermined battery voltage output with means coupled to the battery output and having a control input coupled to the monitoring means.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
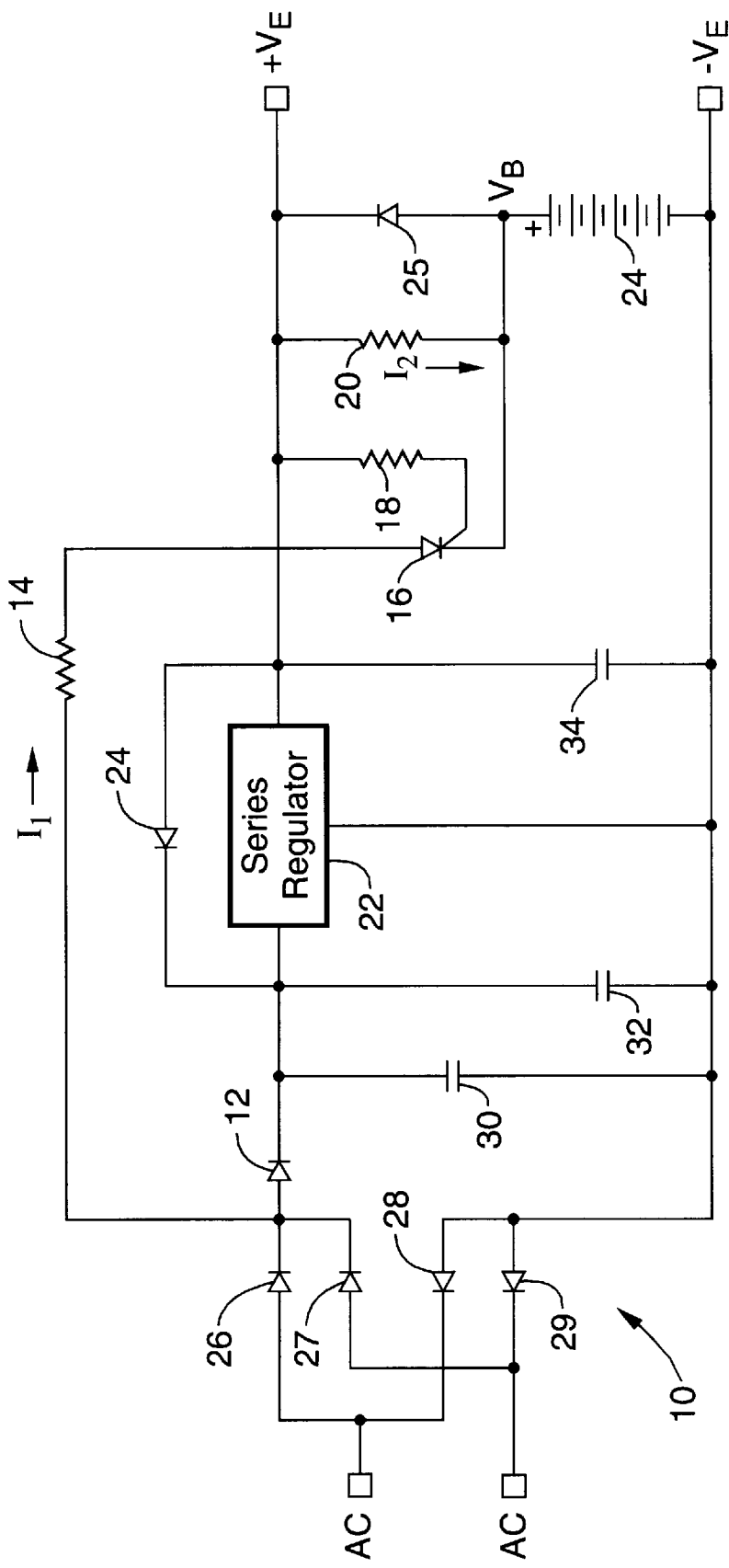
FIG. 1 is a circuit diagram of the invention for float charging and rapidly charging a battery connected to a series regulated power supply.

Referring to FIG. 1, a diagram of a power supply circuit 10 comprising the invention is shown. Such a power supply circuit 10 is used with a rechargeable lead acid battery 24 in "standby" applications for use when a prime power failure occurs. The battery 24 is 12 volts and it is normally floated from the 13.65±0.25 volt output ($V_E$) of the power supply circuit 10.

Power supply circuit 10 comprises a diode network 26, 27, 28, 29 for rectifying the alternating current (AC) input. A series regulator 22 provides control for maintaining a predetermined output voltage ($V_E$) within a certain tolerance for varying loads and varying input voltage. Filter capacitors 30 and 32 are provided for filtering on the input of the series regulator 22 and filter capacitor 34 is provided on the output of series regulator 22.

The novelty of circuit 10 comprises the addition of the following components: diode 12, resistor 14, silicon control rectifier 16, resistor 18 and resistor 20. The other components of circuit 10 may vary depending on designer's choice for a particular regulated PSU that utilizes an input step-down main transformer.

Figure 2:
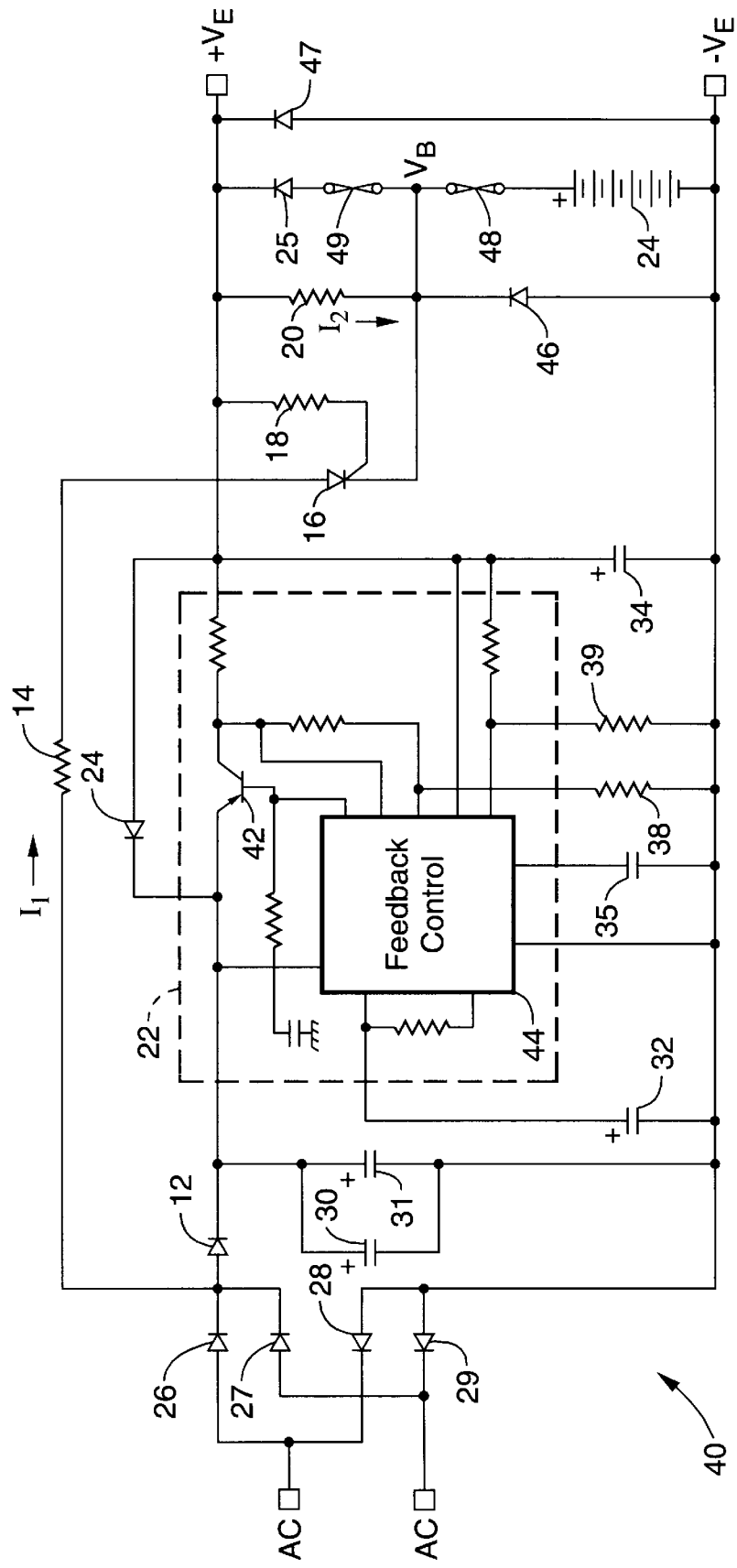
FIG. 2 is a circuit diagram of the invention applied to a feedback, current limited, series regulated power supply.

Referring now to FIG. 2, a 12 volt, 3 amp feedback, limited, linear, regulated PSU 40 is shown employing the rapid bulk circuitry comprising components 12, 14, 16, 18, and 20 as in FIG. 1. FIG. 2 was built and tested to verify that the addition of such components provides a bulk charge of typically 70% of the batteries' capacity in a short time without the need for, and the cost of, a higher current, fixed voltage PSU, without additional cooling/heatsinking associated with a higher current PSU, and without placing additional load on the regulated PSU. The rapid bulk circuitry comprising diode 12, resistor 14, SCR 16, resistor 18 and resistor 20 are all small, low cost and dissipate very little heat.

Still referring to FIG. 2, under normal "float" charging conditions when the battery 24 is fully, (or near fully) charged, the battery maintenance (or charge) current is derived from the normal regulated output ($V_E$) of circuit 40 via resistor 20. Resistor 20 is selected to (a) limit the current drawn from the regulated output ($V_E$) with a flat (or discharged) battery, (b) determine the point when the apparatus "boosts" the battery charge current, and (c) ensure the battery achieves full charge. Values would typically, but not exclusively, be in the range of 1–10 ohms, 1–3 watt. In FIG. 1 and FIG. 2, resistor 20 equals 2.2 ohms, 2.5 watts. This value limits the peak current drawn from the regulated supply circuit 10 and circuit 40 to approximately (13.65–12.0 volts)/2.2 ohms=0.75 amps, enables the "boost" when the current drawn from the regulated supply circuit 10 exceeds approximately 0.65/2.2 ohms=0.3 amps, and ensures complete charge. A potential difference of 44 mV, resulting from a typical maintenance current of 20 ma will have negligible effect on the charge capacity of the battery.

Figure 3:
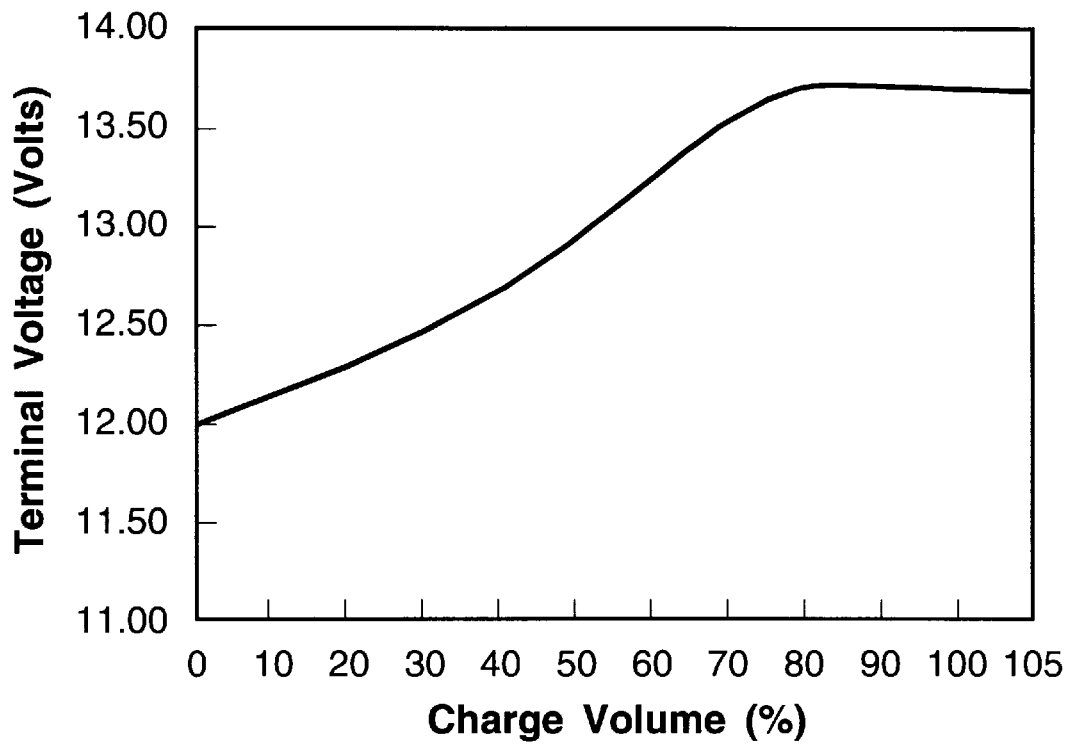
FIG. 3 is a graph of terminal voltage (volts) versus charge volume (%)
Figure 4:
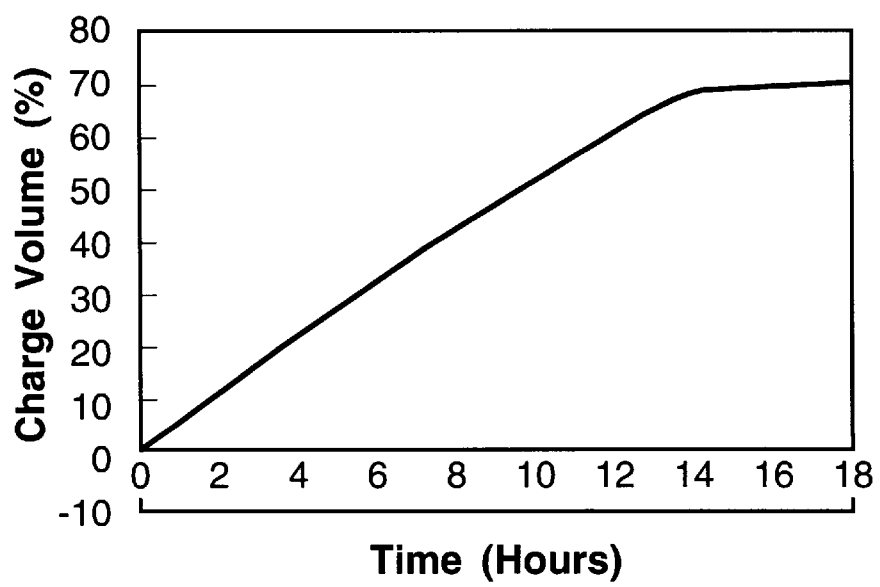
FIG. 4 is a graph showing the charge volume (%) versus time.

Still referring to FIG. 2 and also FIG. 3 and FIG. 4, if the battery 24 is not fully charged, its terminal voltage ($V_B$) will be less than 13.65 volts. The battery terminal voltage ($V_B$) is dependant upon charged volume and a typical variation of voltage versus charge volume for a small capacity valve regulated lead acid battery being charged at a constant current of 0.2 CA is shown in FIG. 3. FIG. 4 also shows the time it takes for the battery 24 to reach a certain charge volume percentage.

When a "flat" battery is connected to the PSU 40, the battery terminal voltage will initially be, or will very rapidly rise to, approximately 12.0 volts. Under this point the current flowing into the battery 24 will be $I_2$ plus $I_i$. $I_1$ will initially be approximately (13.65–12.0)/2.2 ohms=0.75 A. However, the voltage developed across resistor 20, approximately 13.65−12.0=1.65 V, is sufficient to "turn on" control rectifier (SCR) 16 and switch it into conduction when the voltage across resistor 14 rises above the battery terminal voltage ($V_B$). At this point current $I_1$ will additionally flow into the battery 24, increasing the charge current by an amount set by the transformer output voltage, its internal characteristics and the resistor 14.

Resistor 14 is chosen to limit the current drawn when SCR 16 "boosts" the battery charge current, to keep the SCR 16, the rectifier diodes 26, 27, 28, 29 and the transformer (not shown) within their respective operating envelopes, and to limit the maximum battery charge current if required by the battery size/type. Values would typically, but not exclusively, be in the range 0.1–10 ohms, 5–25 watts. In FIG. 2, resistor 14 is a 1.0 ohm, 10 watts, wire wound resistor mounted on a good heatsink. Resistor 14 limits current $I_1$ to approximately 6 amp peak, and as noted before, keeps the SCR 16, the rectifier diodes 26, 27, 28, 29 and the transformer (not shown) within their respective electrical and thermal operating envelopes.

Diode 12 provides for the power supply unit 40 to operate in either a standby mode or a rapid bulk charge mode. When the battery voltage 24 is low, the voltage across resistor 20 causes the SCR 16 to switch on drawing current $I_1$. The voltage at the intersection of diodes 26, 27 drops and diode 12 becomes reversed biased. Hence, current $I_1$ flows through resistor 14 and is blocked from flowing through the series regulator 22. This is the rapid bulk charge mode. When the diode 12 is forward biased, the power supply unit 40 operates in the standby mode whereby the float charge is provided to the battery 24 via resistor 20.

During the period when SCR 16 conducts, voltage $V_B$ will increase because of the potential difference developed across the combination of the battery 24 impedance and the resistance of the battery leads 48 and associated electrical path. During this period $I_2$ will tend to reduce, often by a significant amount.

SCR 16 will cease conducting when voltage across resistor 14 falls below the battery terminal voltage ($V_B$). At this point current $I_1$ will reduce to zero and the battery 24 will again be charged from the main supply via resistor 20. This cyclic "boosting" of the battery 24 charge current will continue providing the voltage across resistor 20 remains above the SCR 16 turn-on threshold. When the voltage across resistor 20 is insufficient to switch SCR 16 "on", current $I_1$ will fall to, and remain at, zero, and the battery 24 will be brought to full charge by $I_2$ flowing through resistor 20.

The regulated power supply unit 40 comprises a series transistor 42 which is coupled to a feedback control chip 44, commonly known in the power supply art.

Figure 5:
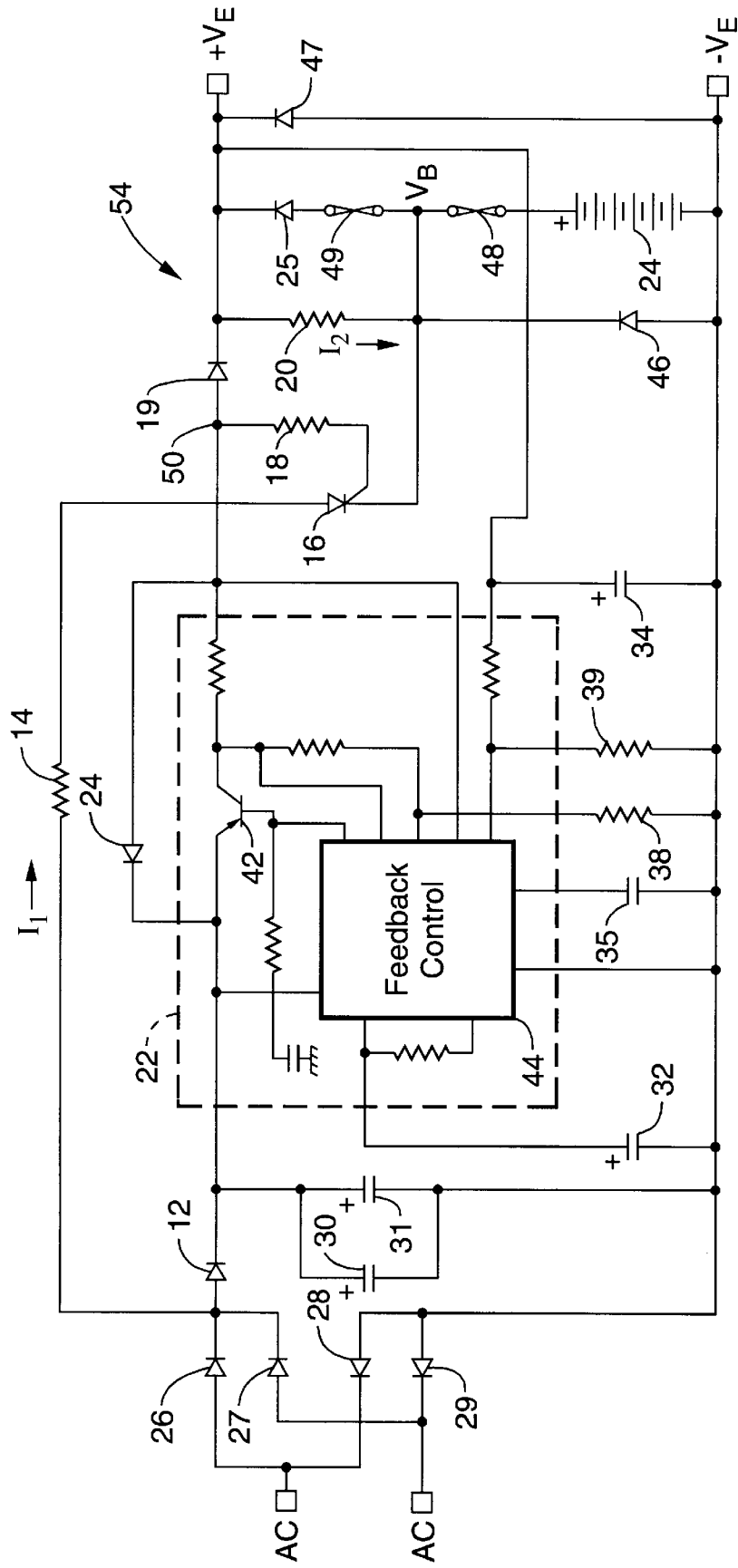
FIG. 5 is a circuit diagram of an alternate embodiment of the invention for increasing bulk charge capacity beyond 70%.

Referring to FIG. 5, an alternate embodiment of the circuit diagram of FIG. 2 is shown for increasing bulk charge capacity beyond 70%. There are a number of variations to the circuit of FIG. 2 which will increase the bulk charge capacity beyond 70%. The circuit 54 of FIG. 5 illustrates one of these variations by increasing the voltage at node 50 by typically 0.3–0.4 volts while maintaining node 52 at 13.65±0.25 volts. This is accomplished by the addition of Schottky diode 19 between nodes 50 and 52 having a constant $V_f$=0.4 volts. This circuit 54 results in the bulk charge being increased to approximately 80% after 16 hours, to approximately 90% after 18 hours, and to approximately 95% after 19 hours. However, extending the bulk charge much beyond 80% should only be considered if ambient conditions and component tolerances are known in order to prevent problems associated with overcharge.

The power supply units 10, 40, and 54 of FIG. 1, FIG. 2 and FIG. 5 can also be applied to other applications where the lead acid battery would normally be "cyclically" charged such as electric wheelchairs, electric golfcarts, electric lawnmowers and similar powered garden tools. The apparatus provides a rapid "boost" charge to replenish the bulk of the battery's capacity followed by a "float" charge which is acceptable for an almost indefinite period. The apparatus avoids the need for timers, sensing and switching circuitry, etc., normally associated with "cyclic" chargers which are needed to prevent overcharge, battery damage or life reduction, and in the case of wet batteries an increased risk of fire or explosion due to gassing. This circuit of FIG. 2 provides a bulk charge of approximately 70% capacity to a 65 AMP -HR battery within 14 hours.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed as new and desired to be secured by Letters Patent of the United States is:

1. A circuit arrangement for rapidly charging a battery comprising:

power supply means for providing a regulated voltage and an unregulated voltage;

resistor means coupled between said regulated voltage and a positive terminal of said battery for providing a current path to float charge said battery;

switching means, coupled between said positive terminal of said battery and said unregulated voltage via a series resistor, for providing a current path to rapid bulk charge said battery in response to a control signal;

said switching means comprises a control input for receiving said control signal, said control input being coupled to said regulated voltage via a current limiting resistor; and diode means coupled between said unregulated voltage and a series regulator of said circuit arrangement for enabling said power supply means to operate in a float charge mode or in a rapid bulk charge mode in accordance with a predetermined value of said battery voltage.

2. The circuit arrangement as recited in claim 1 wherein said switching means comprises a control rectifier means for providing a bulk charge to rapidly charge said battery.

3. A circuit arrangement for rapidly charging a battery comprising:

power supply means for providing a regulated voltage and an unregulated voltage;

first diode means having a constant $V_f$ connected in series with resistor means for increasing bulk charge capacity and providing a current path to float charge said battery, one end of said first diode means being coupled to said regulated voltage and one end of said resistor means being coupled to a positive terminal of said battery;

switching means, coupled between said positive terminal of said battery and said unregulated voltage via a series resistor, for providing a current path to rapid bulk charge said battery in response to a control signal;

said switching means comprises a control input for receiving said control signal, said control input being coupled to said regulated voltage via a current limiting resistor; and second diode means coupled between said unregulated voltage and a series regulator of said circuit arrangement for enabling said power supply means to operate in a float charge mode or in a rapid bulk charge mode in accordance with a predetermined value of said battery voltage.

4. The circuit arrangement as recited in claim 3 wherein said switching means comprises a control rectifier means for providing a bulk charge to rapidly charge said battery.

5. A circuit arrangement for rapidly charging a battery, comprising:
   (a) charging means for charging a battery said charging means having a standby mode and a rapid bulk charge mode;
   (b) monitoring means coupled between an output of said battery and an output of said charging means for monitoring battery voltage output and providing a float charge to said battery when said charging means is in said standby mode; and
   (c) rapid bulk charge providing means coupled to said battery output for providing a rapid bulk charge to said battery when said monitoring means senses a predetermined battery voltage output, said rapid bulk charge providing means comprising a control input coupled to said monitoring means.

6. The circuit arrangement as recited in claim 5 wherein said battery charging means provides a regulated voltage and an unregulated voltage.

7. The circuit arrangement as recited in claim 6 wherein said monitoring means comprises a resistor, coupled between said regulated voltage and said battery voltage output, said resistor providing current limiting when said float charge is provided to said battery.

8. The circuit arrangement as recited in claim 5 wherein said means for providing said bulk charge comprises a control rectifier.

9. The circuit arrangement as recited in claim 8 wherein said means for providing said bulk charge further comprises a resistor having a first terminal in series with said control rectifier means for limiting said charge current and a second terminal connected to an unregulated voltage of said circuit arrangement.

10. The circuit arrangement as recited in claim 6 wherein said battery charging means comprises a diode means, coupled between said unregulated voltage and an input of a voltage regulator of said circuit arrangement, for preventing current flow when said circuit arrangement is operating in said rapid bulk charge mode.

11. The circuit arrangement as recited in claim 5 wherein said circuit arrangement comprises a feedback, current limited, regulated power supply.

12. The circuit arrangement as recited in claim 5 wherein said monitoring means comprises a resistor connected in series with a diode providing a constant $V_f$, one end of said diode being coupled to said regulated voltage and one end of said resistor being coupled to said battery output.

13. A method of providing a circuit arrangement for rapidly charging a battery comprising the steps of:
   (a) charging a battery with means having a standby mode and a rapid bulk charge mode;
   (b) monitoring battery voltage output and providing a float charge to said battery when said charging means is in said standby mode with means coupled between an output of said battery and an output of said charging means; and
   (c) providing a rapid bulk charge to said battery when said monitoring means senses a predetermined battery voltage output, said rapid bulk charge providing means comprises a control input coupled to said monitoring means.

14. The method as recited in claim 13 wherein said method includes the step of said circuit arrangement providing a regulated voltage and an unregulated voltage.

15. The method as recited in claim 14 wherein said step of monitoring said battery voltage comprises the step of providing a resistor coupled between said regulated voltage and said battery voltage output, said resistor providing current limiting when said float charge is provided to said battery.

16. The method as recited in claim 13 wherein said step of providing a rapid bulk charge to said battery comprises the step of providing a control rectifier to pass a charge current to said battery.

17. The method as recited in claim 16 wherein said step of providing said rapid bulk charge to said battery comprises the step of providing a resistor having a first terminal in series with said control rectifier for limiting said charge current and a second terminal connected to an unregulated voltage of said circuit arrangement.

18. The method as recited in claim 14 wherein said step of charging a battery having at least two charging modes comprises the step of providing a diode coupled between said unregulated voltage and an input of a voltage regulator of said circuit arrangement, for preventing current flow through said voltage regulator when said circuit arrangement is operating in said rapid bulk charge mode.

19. A circuit arrangement for rapidly charging a battery, comprising:
   (a) a battery charging circuit having a standby mode and a rapid bulk charge mode;
   (b) a battery voltage monitoring circuit coupled between an output of a battery and an output of the battery charging circuit which monitors battery voltage output and provides a float charge to the battery when the battery charging circuit is in the standby mode; and
   (c) a rapid bulk charging circuit coupled to the battery output and having a control input coupled to the battery voltage monitoring circuit which provides a rapid bulk charge to the battery when the battery voltage monitoring circuit senses a predetermined battery voltage output.

20. A method for charging a battery, comprising the steps of:
   (a) charging a battery with a battery charging circuit having a standby mode and a rapid bulk charge mode;
   (b) monitoring battery voltage output and providing a float charge to the battery when the battery charging circuit is in the standby mode with a battery voltage monitoring circuit coupled between an output of a battery and an output of the battery charging circuit; and
   (c) providing a rapid bulk charge to the battery when the battery voltage monitoring circuit senses a predetermined battery voltage output with a rapid bulk charging circuit coupled to the battery output and having a control input coupled to the battery voltage monitoring circuit.

* * * * *